April 5, 1932.　　　　J. W. LEIGHTON　　　　1,852,321
SPRING SHACKLE
Filed Sept. 3, 1931

Inventor.
John Wycliffe Leighton.
by
atty

Patented Apr. 5, 1932

1,852,321

UNITED STATES PATENT OFFICE

JOHN WYCLIFFE LEIGHTON, OF PORT HURON, MICHIGAN

SPRING SHACKLE

Application filed September 3, 1931. Serial No. 560,897.

The principal objects of this invention are to provide a spring shackle which will eliminate side play and will reduce wear to the minimum and which may be very easily installed.

The principal feature of the invention consists in the novel construction of a pair of shackle members adapted to be interconnected and each having a threaded bearing portion rotatably engaging a threaded surface in the supporting members.

Figure 1:
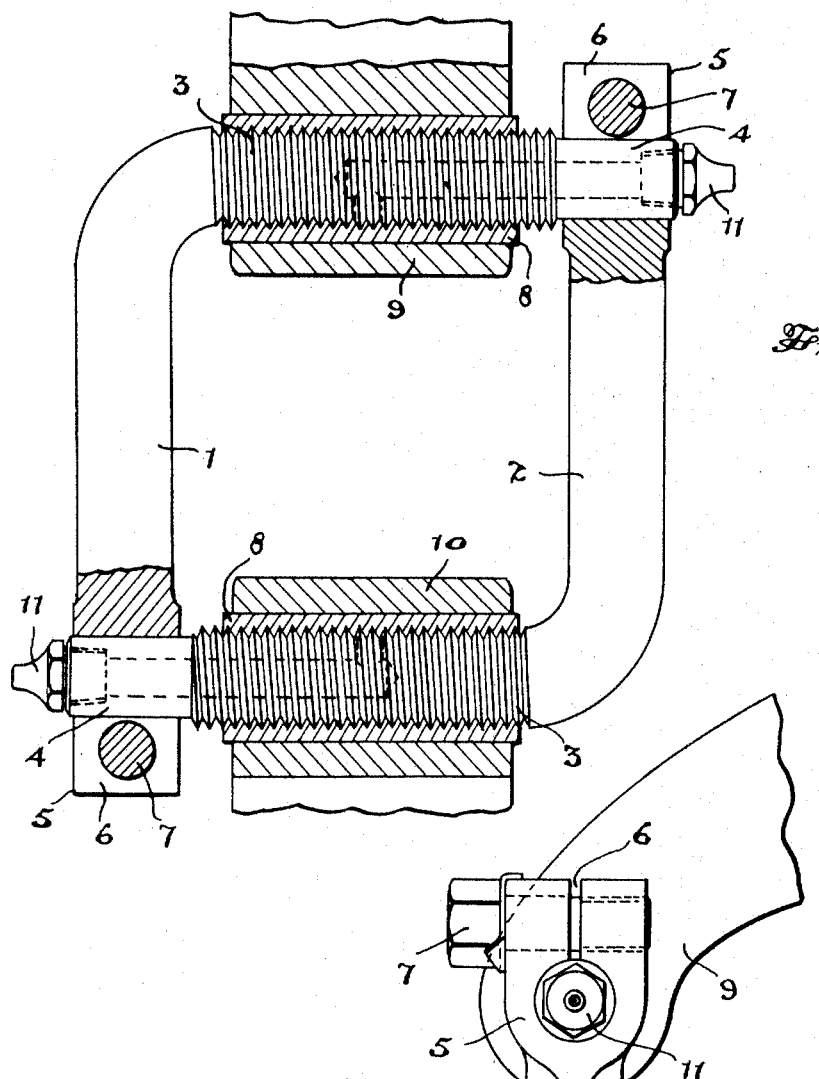

In the drawings Figure 1 is an elevational part sectional view of the device.

Figure 2:
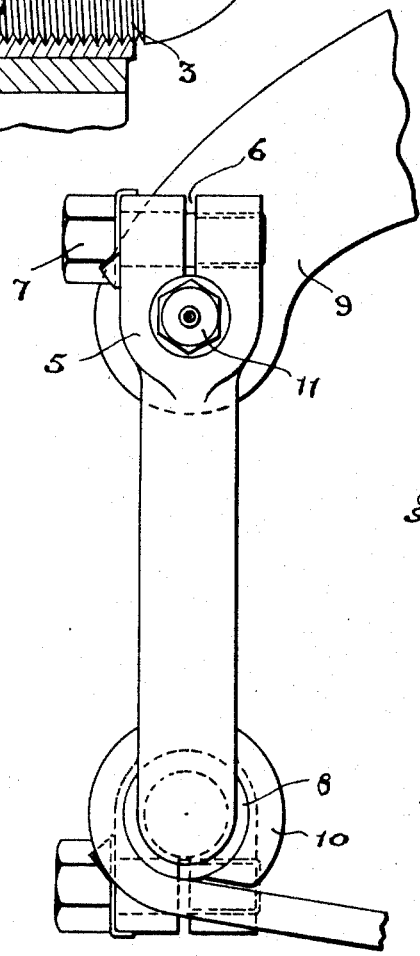

Figure 2 is a side elevational view.

The construction of shackle herein shown comprises a pair of bars 1 and 2, each similarly formed with a right angled bent portion 3 threaded externally for the major portion of its length and having a reduced end 4. The opposite end of each of the members 1 and 2 is formed with an enlarged head end 5 which is bored transversely to receive the reduced end 4 of the mating member.

The head is split transversely with a slot 6 and a clamping screw 7 is arranged to extend across the slot to bind the head upon the reduced extension 4 of the mating member.

Each of the threaded right angular portions 3 are threaded into bushings 8 and these bushings are pressed into or otherwise secured in cylindrical openings in the frame bracket 9 and spring end 10 respectively.

The terminal ends of the reduced portions 4 are bored to form a lubricant passage which connects with the threaded surface about midway of its length and a suitable fitting 11 is arranged at the other end.

The threaded portions of the shackle members are a free turning fit in the threaded bushings and the bushings are held from rotation in a supporting bracket and spring end so that the oscillating movement of the shackle is carried by the surfaces of the threaded members, thus providing a greater bearing surface than the actual length of the bushings, and also eliminating any end play of the shackle bolt in the bushings. This entirely obviates binding of moving surfaces and the lubricant is applied centrally and works outwardly to both ends, ensuring always that the bearing surfaces will be lubricated and dirt will be prevented from entering between the bearing surfaces.

In the assembly of this shackle, the bushings are mounted on the individual shackle members and they are then pressed into place in the frame lug and the spring eye, the reduced ends of the threaded portions being brought into alignment with and entering the bored and slotted ends. When the bushings have thus been properly placed, the jaw members are tightened by means of the screws 7.

A structure such as described is very easily and simply manufactured and assembled and when in position will be extremely efficient to resist wear and side thrust and as there are no flat contact surfaces liable to rub dry, squeaking will be eliminated.

What I claim as my invention is:

In a spring shackle, the combination with the spring end and the frame end, each having a threaded transverse bearing, of a pair of shackle members each having threaded portions engaging said threaded bearings and portions extending parallel, said parallel extensions having bored and slotted ends, binding screws extending across the slotted ends, and the threaded portions having reduced extension portions each fitting the oppositely bored end of the other shackle member.

JOHN WYCLIFFE LEIGHTON.